United States Patent Office 3,454,018
Patented July 8, 1969

3,454,018
APPARATUS FOR PROCESSING BEER KEGS OR LIKE CONTAINERS
Maurice Ruddick, Rochester, England, assignor to Burnett & Rolfe Limited, Strood, Rochester, Kent, England, a British company
Filed Oct. 16, 1967, Ser. No. 675,541
Claims priority, application Great Britain, Nov. 8, 1966, 49,938/66
Int. Cl. B08b 3/10, 9/08
U.S. Cl. 134—57     4 Claims

ABSTRACT OF THE DISCLOSURE

Apparatus for automatically washing beer kegs or like containers comprises a head which is applied to the bung hole or other opening of the container with the container inverted, pipes connected to the head for the supply of washing water and detergent for washing the container and steam for blowing the water and detergent out of the container after washing and a drainage pipe through which the discharged water and subsequently the steam flows from the container. The supply of water, detergent and steam is controlled by pneumatically operated valves in the pipes and the supply of air to control these valves is controlled by solenoid valves operated by an electrical sequence controller. The drainage pipe has an electrical temperature sensitive device electrically connected to the sequence controller which prevents the sequence controller from operating said valves to cause further washing water or detergent to be supplied to the container until all previous liquid has been blown out by the steam and there is a flow of steam through the drainage pipe over the temperature sensitive device.

---

Metal kegs and like containers such as are now generally used for holding beer and other potable liquids are usually washed after use and subsequently refilled in a brewery or other filling place by means of automatic machinery.

It is important to ensure that the containers are empty and do not contain any stale beer or other liquid before a subsequent operation on the container is carried out.

To this end, apparatus for emptying a beer keg or like container having a bung hole or other opening in its top comprises a head which is arranged to be applied to a bung hole or other opening of the container with the container inverted, the head having a duct for the supply of venting steam under pressure and a drainage duct, and a temperature sensitive control device which is sensitive to the temperature of fluid flowing from the container through the drainage duct, the control device causing a control operation to take place when the fluid temperature rises above a predetermined minimum.

The temperature of any stale beer or other liquid which may be in the container is substantially below that of steam at atmospheric pressure and the predetermined temperature at which the temperature sensitive control device is set to operate is in between these two temperatures so that while liquid is flowing through the drainage duct the control operation does not occur, but as soon as the liquid has been exhausted, the steam flowing through the duct actuates the control device so that the control operation is performed.

This operation may be the bringing into action of a conveyor for moving on the container to another automatic machine or it may be the starting of a filling operation by a filling machine of which the apparatus forms part. Preferably, though, the apparatus is incorporated in apparatus for washing out the containers. In this washing out apparatus, the head has a duct for the supply of washing liquid and valves are provided for controlling the supply of steam and washing liquid and then the control operation caused by the temperature sensitive device is the opening of the valve controlling the supply of washing liquid.

The washing liquid and the steam may pass through the same duct in the head, the washing liquid being supplied through one pipe and the steam through another pipe. In the course of the washing operation, washing liquid is supplied and then this is shut off and steam under pressure is supplied for blowing out the washing liquid. This cycle may then be repeated a number of times.

In previous automatic washing apparatus, the valve controlling the supplies of washing liquid and steam have been opened and closed solely on a time cycle under the control of a timing device. First the valve in the washing liquid supply is opened for a set period and subsequently this valve is closed and the valve in the steam supply is opened for a period which is sufficient to allow all the washing liquid to be blown out of the container. However, this previous arrangement has the disadvantage that, should the drainage duct be obstructed or should the container contain any stale beer or other liquid at the start of the operation, the time during which the valve in the steam supply is open may be insufficient to allow all the liquid to be blown out. The container may therefore be incompletely washed and it may at the end of the washing operation still contain some stale beer or other liquid mixed with washing liquid or it may contain washing liquid with some detergent or other washing substance in it. This is extremely undesirable because the keg or other container is commonly moved automatically on from the washing apparatus to a filling machine where it is refilled and, of course, any remaining washing liquid or stale beer in the refilled container is disastrous.

With washing apparatus in accordance with the present invention, the temperature sensitive device prevents a further operation taking place, such as the supply of further washing liquid until any liquid already in the container has been blown out and there is a flow of steam through the drainage duct.

The washing apparatus also preferably includes a conveyor for conveying containers away from the head after washing. A further control operation which is then performed by the temperature sensitive control device consists in bringing the conveyor into action. This thus happens when the control device senses a temperature rise in the drainage duct after the final supply of washing liquid and this ensures that the container is empty before it is conveyed away from the washing apparatus.

An example of apparatus in accordance with the invention for washing out beer kegs or like containers is illustrated diagrammatically in the accompanying drawings in which.

Figure 1:
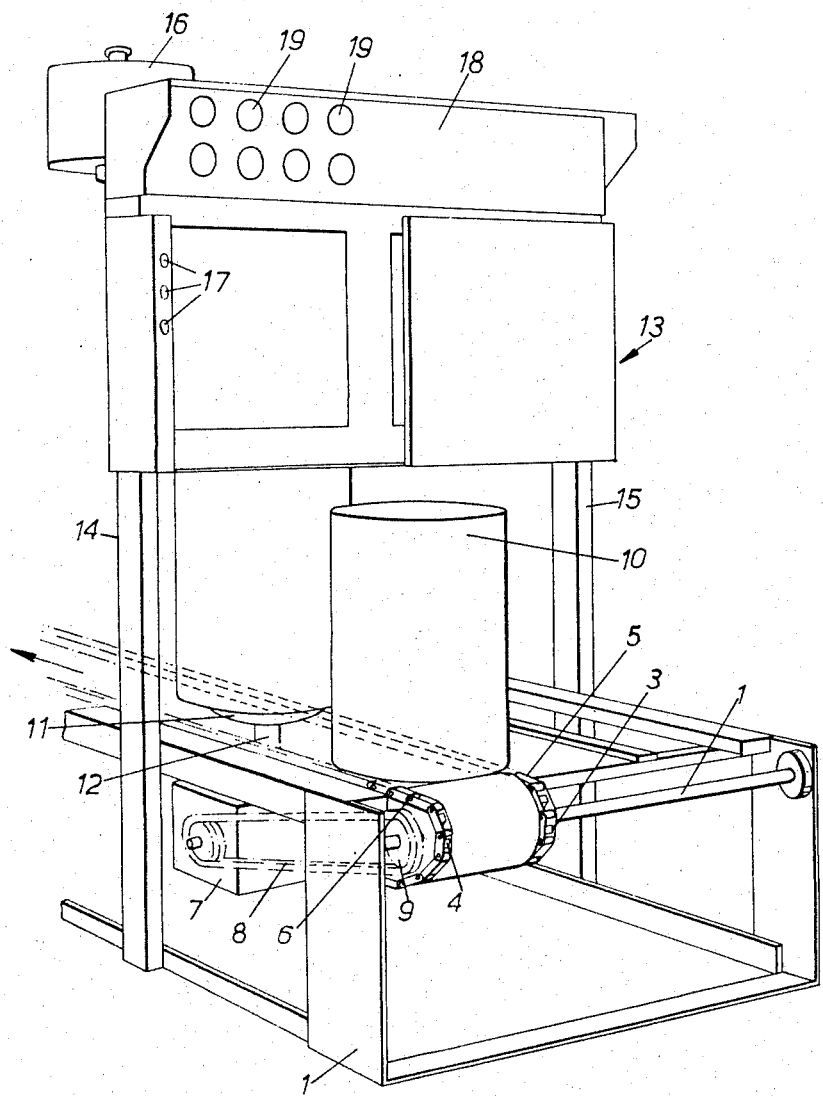
FIGURE 1 is a front perspective view of parts of the apparatus.

As shown in FIGURE 1, the apparatus comprises a base frame 1, of which one end is shown and this supports a shaft 2 carrying sprockets 3 and 4 around which roller chains 5 and 6 extend. The chains 5 and 6 together form a chain conveyor and are supported on sprockets similar to the sprockets 3 and 4 at the other end of the frame 1 which is not shown.

The conveyor formed by the chains 5 and 6 is driven by an electric motor 7 through a transmission chain 8 and a sprocket 9 fixed on the shaft 1 and is arranged to convey a series of containers 10 towards and subsequently away from the washing apparatus which includes a washing head 11 which is arranged to be moved upwards and downwards by a pneumatic ram 12 and a structure 13 which is carried on columns 14 and 15. The structure 13 forms a stop against which the containers 10 are pushed when they are raised by the head 11 on the penumatic ram 12. The structure 13 also supports a detergent container tank 16 and has a number of couplings 17 for the connection of water and air supply pipes and a drainage pipe. At the top of the structure 13 there is also an electrical control panel 18 carrying a number of warning lamps 19 which give visible warning if there is any failure in the electrical system.

As a container 10 is moved along by the conveyor formed by the chains 5 and 6, it comes up against a switch when a filling opening 20 (see FIGURE 2) is centred immediately above the head 11. This switch operates the penumatic ram 12 and causes the head 11 to be raised and pressed against the neck 20. This raises the container 10 from the conveyor and it is then clamped in between the head 11 and the stop formed by the structure 13. With the container clamped in this position, the entire washing cycle of operations takes place and when it has finished, the ram 12 is retracted so that the container 10 is lowered again onto the conveyor formed by the chains 5 and 6, which are thus brought into action to convey the container 10 away, pushing the switch aside.

Figure 2:
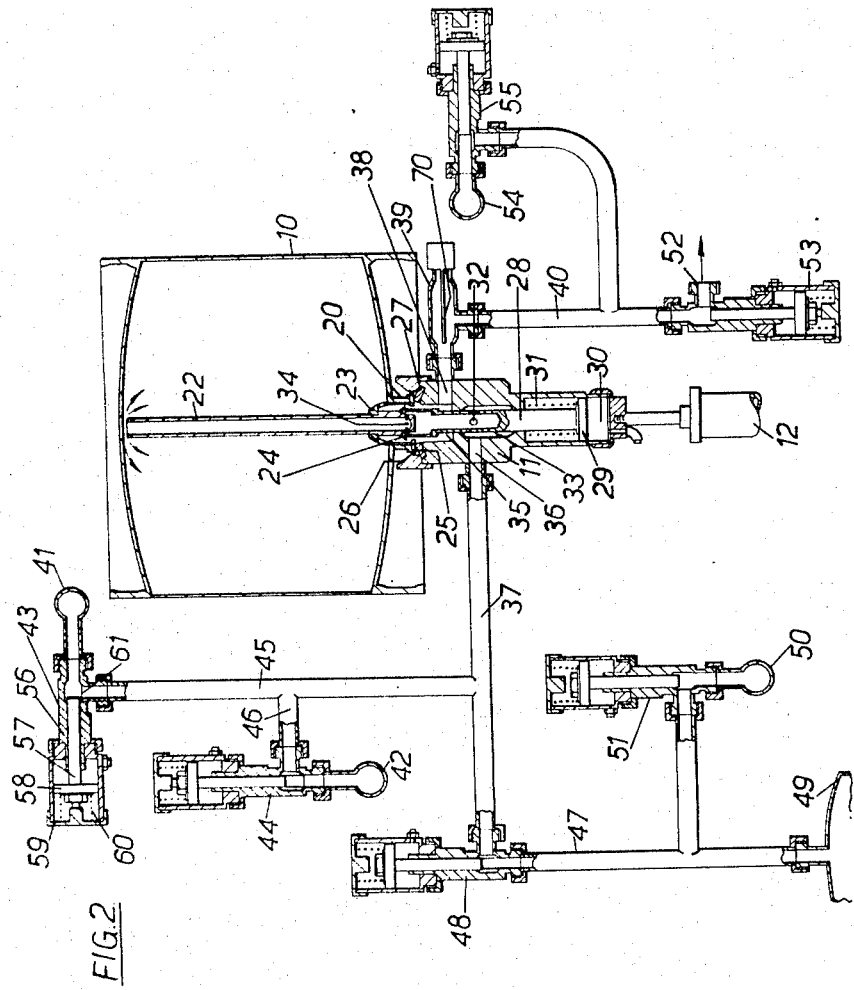
FIGURE 2 is a piping diagram showing the head connected to a container which is being washed and the various liquid and steam supply and drainage pipes leading to the head.

The cycle of washing operations is brought about by the head 11 and the system of pipes and valves shown somewhat diagrammatically in FIGURE 2. As shown here, the container 10, which is inverted, is of the conventional kind which has an internal spear 22 which is mounted so that it can move upwards and downwards through a limited distance through an internal skirt 23 which extends from the neck 20 into the inside of the container 10. The end of the spear 22 within the neck 20 has a sealing ring 24 which is normally held by a spring against a seal 25 around the neck 20.

The head 11 has a socket 26 at its upper end and within this socket is a sealing ring 27. When the head 11 is moved upwards by the pneumatic ram 12, the neck 20 enters the socket 26 and a seal is formed between the sealing rings 25 and 27. Within the head 11 is a tube 28 which is slidable upwards and downwards and is connected to a piston 29 in a pneumatic cylinder 30. Normally the tube 28 is urged downwards by a spring 31, but after the head 11 has been pushed by the ram 12 against the neck 20, air is admitted to the pneumatic cylinder 30 and this pushes the piston 29 and with it the tube 28 upwards. The upper end of the tube 28 seals against the sealing ring 24 on the end of the spear 22 and pushes the spear 22 upwards so that the sealing ring 24 is moved out of engagement with the sealing ring 25 on the neck 20.

When the tube 28 is in its upper position, perforations 32 through its wall are in communication with a chamber 33 within the head 11 and there is communication from this chamber through the perforations 32, through the upper part of the tube 28 and through perforations 34 in the end of the spear 22 into the spear 22 itself. There is also communication from a second chamber 35 within the head 11 through the clearance between the sealing rings 24 and 25 and through perforations in the skirt 23 with the interior of the container 10 outside the spear 22.

A duct 36 leads from the chamber 33 to a pipe 37 and forms a supply duct for the supply of washing liquid and steam through the spear 22 to the container and a duct 38 communicating with the chamber 35 forms a drainage duct and leads through a housing 39 to a drainage pipe 40.

A steam supply pipe 41 and a water supply pipe 42 communicate through similar pneumatically operated valves 43 and 44 respectively and through pipe 45 and 46 with the supply pipe 37. A detergent supply pipe 47 communicates through a valve 48 which is similar to the valves 43 and 44 with the pipe 37 and itself leads from both a detergent metering tank 49 and a detergent recirculating pipe 50. The connection of the pipe 47 to the recirculating pipe 50 is through a further pneumatic valve 51 which is again similar to the valve 43.

The drainage pipe 40 leads to a discharge 52 controlled by a valve 53 and also to a detergent recirculating pipe 54 through a valve 55. The detergent recirculating pipe 54 is connected to the inlet of a recirculating pump which is not shown and the outlet of which is connected through a storage tank to the pipe 50.

Each of the pneumatic valves 43, 44, 48, 51, 53 and 55 comprises, as shown on the valve 43, a housing 56 containing a sliding plunger 57. The plunger 57 is fixed to a piston 58 in a pneumatic cylinder 59. The lefthand end of the cylinder 59 is vented to atmosphere and contains a coiled compression spring 60 which normally urges the plunger 57 towards the right into a position in which it extends over a port 61 and closes the valve. When, however, as shown in FIGURE 2, air is supplied under pressure to the righthand end of the cylinder 59, the plunger 57 is moved against the action of the spring 60 and the valve is opened.

Figure 3:
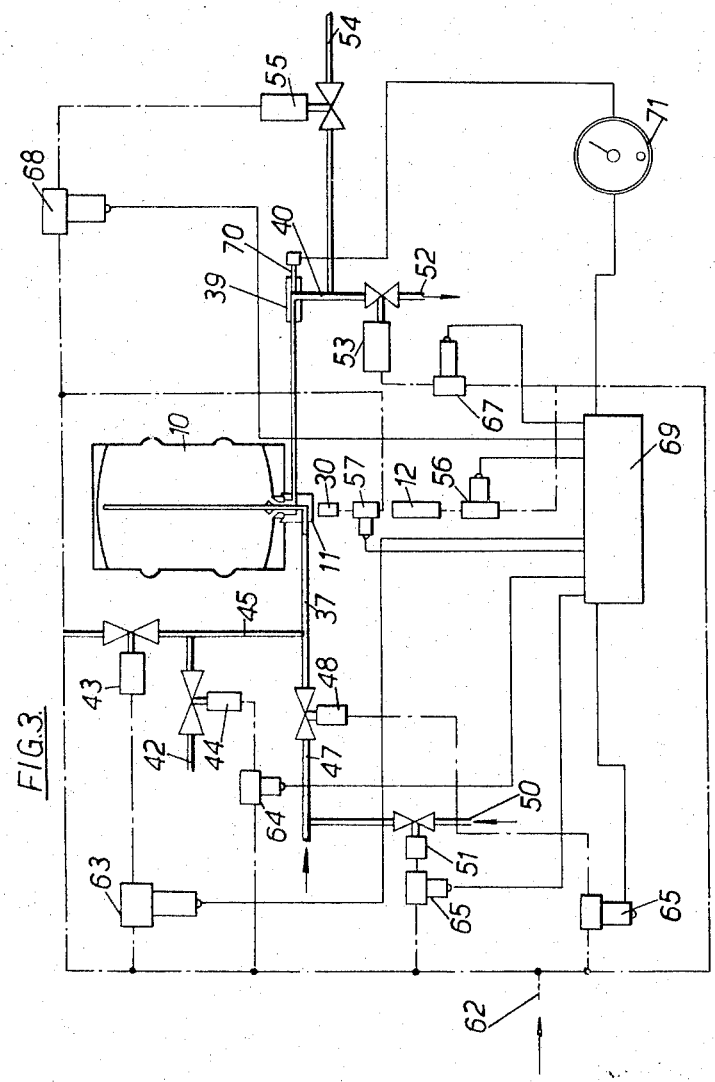
FIGURE 3 is a circuit diagram showing the pipes in FIGURE 2 together with pneumatic and electrical valve control circuits.

In order to perform a cycle of washing operations, the valves 43, 44, 48, 51, 53 and 55 and also electrically operated air valves 56 and 57 which control the supplies of air to the pneumatic ram 12 and to the cylinder 30 are connected in the pneumatic and electrical circuit shown in FIGURE 3.

As shown in this diagram, the valves 43, 44, 48, 51, 53 and 55 are connected to a main air supply 62 through solenoid-operated air valves 63, 64, 65, 66, 67 and 68 respectively. All these air valves, together with the valves 56 and 57 are electrically connected to a sequence controller 69. In addition, a temperature sensitive probe 70 in the housing 38, which senses the temperature of the fluid flowing from the drainage duct 38 to the drainage pipe 40 is electrically connected through a controller 71 to the sequence controller 69.

The temperature sensitive element 70 is in this example a platinum resistance wire thermometer and it is connected to a balanced circuit within the controller 71. The balanced circuit in the controller 71 can be set so that the controller produces a signal at any predetermined temperature which is reached by the temperature sensitive element 70. This signal is transmitted to the sequence controller 69 and the sequence controller 69 is arranged so that various of the operations which it controls in its sequence are prevented from coming about until a signal has been received from the controller 71. In this example, both the controller 71 and the sequence controller 69 consist of solid-state circuits with an electrically operated timer, but instead it may equally well consist of control circuits with electromechanical relays, an electrical timer and mechanically operated valves.

The sequence controller 69 controls the various solenoid-operated air valves as follows:

First of all the valve 56 is opened to operate the pneumatic ram 12 and move the head 11 against the neck 27 of the container 10. Next the valve 57 is opened to move the tube 28 upwards and open the passages into the container 10 outside and through the spear 22.

After this the valve 63 is opened to open the valve 43 and admit steam to the container 10. If the container 10 is empty of liquid, the steam blows through the drainage duct 38 and through the housing 39 so that the temperature of the element 70 is raised and a signal is produced by the controller 71 which causes the sequence controller 69 to continue to its next operation. At this operation, the valve 63 is closed so that the steam supply is shut off and the valve 64 is opened to open the valve 44 and admit water to the container 10 to perform a pre-washing cycle. After a predetermined time, the water supply is shut off and the valve 63 is opened again to supply steam to the container 10 to blow out the water. Whilst the water is flowing out, the temperature of the element 70 is such that no signal is produced by the controller 71 and the sequence controller 69 keeps the valve 63 open so that the supply of steam continues. As soon as the container 10 is empty of liquid, the flow of steam over the element 70 produces another signal from the controller 71 which enables the sequence controller 69 to perform the next operation. This consists of opening the valves 65, and 68 so that the valves 48 and 55 are opened and a metered volume of detergent is then supplied from the tank 49. Simultaneously the valve 67 is closed to close the valve 53. The detergent is thus blown through the container 10 from the tank 49 and through the pipe 54 whence it is pumped to the storage tank and subsequently returned to the tank 49. After a predetermined time, the valve 65, is closed to close air-operated valve 48 and the valve 63 is then opened to bring about a further supply of steam. This supply of steam continues as before until all the detergent has been discharged from the container 10 through the valve 55 and the pipe 54 to the storage tank. After this the valve 68 is closed to close the valve 55 and also the valve 67 is opened to open the valve 53. Further water is then supplied through the valve 44 to wash out remaining traces of detergent and the water is discharged as in the first part of the cycle. However, when all the water has been discharged by the supply of steam, the signal produced by the controller 71 owing to the rise in temperature of the element 70 causes the sequence controller 69 to close the valve 57 thus allowing the spring 31 to lower the tube 28 and also to close the valve 56 which causes the pneumatic cylinder 12 to retract so that the container 10 is lowered onto the conveyor formed by the chains 4 and 5 which are thus brought into action so that the container is conveyed away.

I claim:

1. In apparatus for emptying beer kegs and like containers having means defining an opening in the top of said container, said apparatus comprising means for holding a container in an inverted position with said opening directed downwardly, a head and means for applying said head to said opening, the head including means defining a duct for the supply of venting steam under pressure and means defining a drainage duct, the improvement comprising a temperature sensitive control device which is sensitive to the temperature of fluid flowing from said container through said drainage duct and means operatively connecting said temperature sensitive control device to control means whereby said control means is actuated when said temperature rises above a pre-determined minimum.

2. Apparatus as claimed in claim 1 comprising also means defining a supply duct for the supply of washing liquid and in which said control means comprises valve means in said washing liquid supply duct, said temperature sensitive control device being connected to open said valve means when said temperature rises above said predetermined minimum.

3. Apparatus as claimed in claim 2 in which said control means also comprises valve means in said steam supply duct, said temperature sensitive control device being connected to close said last mentioned valve means when said temperature rises above said predetermined minimum.

4. Apparatus as claimed in claim 2, further comprising conveyor means for conveying containers away from said head after washing, means for rendering said conveyor operative and means operatively connecting said means for rendering said conveyor operative to said control device whereby said rendering means is set in operation to make said conveyor operative when said control device senses a temperature rise in said drainage duct after the drainage of washing liquid.

References Cited
UNITED STATES PATENTS

| | | | |
|---|---|---|---|
| 2,217,705 | 10/1940 | Rataiczek et al. | 134—97 XR |
| 2,244,040 | 6/1941 | Alexander | 134—95 XR |
| 2,526,265 | 10/1950 | Nulph | 134—171 XR |
| 2,769,450 | 11/1956 | Colby | 134—57 |

ROBERT L. BLEUTGE, *Primary Examiner.*

U.S. Cl. X.R.

15—304; 134—97, 133, 166